(12) United States Patent
Miesch et al.

(10) Patent No.: US 12,055,510 B2
(45) Date of Patent: Aug. 6, 2024

(54) MONITORING DEVICE FOR A SYSTEM FOR MEASURING PROCESS VARIABLES, IN PARTICULAR IN LIQUID ANALYSIS

(71) Applicant: Knick Elektronische Messgeräte GmbH & Co. KG, Berlin (DE)

(72) Inventors: Sebastian Miesch, Berlin (DE); Thilo Gödel, Zossen (DE)

(73) Assignee: Knick Elektronische Messgeräte GmbH & Co. KG, Berlin (DE)

(*) Notice: Subject to any disclaimer, the term of this patent is extended or adjusted under 35 U.S.C. 154(b) by 912 days.

(21) Appl. No.: 16/972,522

(22) PCT Filed: Jun. 5, 2019

(86) PCT No.: PCT/EP2019/064651
§ 371 (c)(1),
(2) Date: Dec. 4, 2020

(87) PCT Pub. No.: WO2019/234100
PCT Pub. Date: Dec. 12, 2019

(65) Prior Publication Data
US 2021/0270763 A1    Sep. 2, 2021

(30) Foreign Application Priority Data

Jun. 6, 2018  (DE) .................. 10 2018 208 944.2

(51) Int. Cl.
*G01N 27/28* (2006.01)
*G08C 17/02* (2006.01)
(Continued)

(52) U.S. Cl.
CPC .......... *G01N 27/286* (2013.01); *H01F 38/14* (2013.01); *G08C 17/02* (2013.01); *G08C 17/04* (2013.01);
(Continued)

(58) Field of Classification Search
CPC ...... G01N 27/286; G08C 17/02; G08C 17/04; H01F 38/14; H01F 2038/143; H04Q 9/00; H04Q 2209/40
See application file for complete search history.

(56) References Cited

U.S. PATENT DOCUMENTS

2015/0007636 A1   1/2015   Benkert et al.
2015/0032386 A1   1/2015   Pechstein et al.

FOREIGN PATENT DOCUMENTS

DE   102008043297 A1   5/2010
DE   102008053920 A1   5/2010
(Continued)

OTHER PUBLICATIONS

Knick Elektronische Messgeräte GmbH & Co. KG, Advanced Liquid Analysis, retrieved from https://www.knick-international.com/export/media/13210.pdf on Nov. 25, 2020.
(Continued)

*Primary Examiner* — Jennifer Wecker
*Assistant Examiner* — Kathryn Elizabeth Limbaugh
(74) *Attorney, Agent, or Firm* — Smartpat PLC

(57) ABSTRACT

A monitoring device for a system for measuring process variables, in particular in liquid analysis, which measuring system comprises a sensor (2) for recording a process variable and a contactless, inductive plug-in connection (5) between the sensor (2) and a cable (6) for preferably bidirectional transfer of digital signals between the sensor (2) and a remote transducer (7), the monitoring system comprising: a coupling device (17) that can be placed on the plug-in connection (5) and operates without contact to record the signals transferred via the plug-in connection (5), an evaluation device (21) for evaluating the recorded signals, and a display device (22) for presenting the evaluated signals.

15 Claims, 4 Drawing Sheets

(51) Int. Cl.
  *G08C 17/04*   (2006.01)
  *H01F 38/14*   (2006.01)
  *H04Q 9/00*    (2006.01)

(52) U.S. Cl.
  CPC ......... *H01F 2038/143* (2013.01); *H04Q 9/00* (2013.01); *H04Q 2209/40* (2013.01)

(56) References Cited

FOREIGN PATENT DOCUMENTS

| | | |
|---|---|---|
| DE | 102009028794 A1 | 2/2011 |
| DE | 102013107964 A1 | 1/2015 |
| EP | 2233994 B1 | 4/2014 |

OTHER PUBLICATIONS

Knick Elektronische Messgeräte GmbH & Co. KG, Portavo. The first portables with Memosens technology for measuring pH, ORP, conductivity, and oxygen. Retrieved from https://www.knick-international.com/export/media/16193.pdf on Nov. 25, 2020.

MONITORING DEVICE FOR A SYSTEM FOR MEASURING PROCESS VARIABLES, IN PARTICULAR IN LIQUID ANALYSIS

CROSS-REFERENCE TO RELATED APPLICATIONS

The present patent application claims the priority of German patent application DE 10 2018 208 944.2, the contents of which are incorporated by reference herein.

TECHNICAL FIELD

The disclosure relates to a monitoring device for a system for measuring process variables, in particular in liquid analysis, and a measuring system with such a monitoring device.

BACKGROUND

Such measuring systems have as basic components a sensor for recording a process variable along with a contactless, inductive plug-in connection between such sensor and a cable for preferably bidirectional transfer of digital signals between the sensor and a remote transducer. As an example of such a measuring system according to the state of the art, reference should be made to the so-called "Memosens sensors."

With this measuring system, sensors are used, for example, to measure parameters for liquid analysis, such as pH value, redox, conductivity and oxygen content, which sensors digitize the corresponding measurement signals and transfer them inductively, that is contactlessly, to a remote transducer via a plug-in connection between the sensor and a cable. This inductive connection supplies the sensor with power and enables a galvanically isolated, bidirectional signal transfer between the sensor and the cable coupling. A data memory is integrated in the sensor, which documents its complete life cycle with relevant data, such as total operating hours, operating hours under extreme process conditions, calibration history, etc.

With regard to the background of the invention, it should be noted that there are applications in the chemical or pharmaceutical industry where, thanks to such digital sensors, an on-site display can be dispensed with. Measured values are digitally transmitted directly to the transducer in a control room, where the measured values are displayed and/or further processed accordingly.

The disadvantage of such a structure of the measuring system is that there is no access to measured values and sensor data on site at the measuring point, where the sensor intervenes in the process to be monitored. This is particularly hindering when starting up a process system or during maintenance work. In order to access sensor data, the cable must be removed from the sensor and a handheld device must be connected. On the one hand, it is not possible to measure "online" on site; on the other hand, the data flow between the sensor and the transducer must be interrupted when carrying out such a measurement on site.

SUMMARY

To solve this problem, a separate monitoring device is presented which includes a coupling device that can be placed on the plug-in connection and operates without contact to record the signals transferred via the plug-in connection. It further includes an evaluation device for evaluating the recorded signals, and a display device for presenting the evaluated signals.

Due to this monitoring device, it is now at least possible to record and display the data transferred via the plug-in connection of the measuring system on site at the position of the sensor in the process, without having to intervene in the plug-in connection and thus the communication between the sensor and the transducer. This makes startup and maintenance work on the measuring system much easier.

Since, within the framework of Memosens technology, many sensors only transfer so-called "raw values," that is, a voltage in the millivolt range representative of the actual measured value, which are then evaluated in the transducer with the calibration data of the sensor and transformed into the actual measured value, such as the pH value, the monitoring device itself has an evaluation device that fulfills such object and displays the measured value of interest in its display device.

Preferential additional embodiments of the monitoring device are disclosed. For example, the coupling device has at least one receiving coil for the contactless recording of the signals transferred via the plug-in connection, which can then receive the signals inductively transferred via it by placing the coupling device on the plug-in connection and forward them to the evaluation device.

The latter, together with the display device, is preferably arranged in a handheld device that is connected to the coupling device by a cable connection. This means that the monitoring device can be handled, read and operated on site particularly ergonomically. A design in which the coupling, evaluation and display device in a device unit can be placed on the plug-in connection as a monitoring device is likewise conceivable as a preferential embodiment.

As an alternative to a cable connection between the coupling device and the handheld device, a wireless connection can also be used, for example, according to a common industrial radio standard.

Preferentially, all measured values of process variables captured by the sensor, or sensor data, in particular calibration and/or load data of the sensor, can be recorded by the monitoring device, evaluated and output via the display device on site, independently of a control room for the process. Thus, the monitoring device can perform a type of "observation function."

Since, in addition to observing transferred data, it may also be desirable to influence the sensor on site in order to optimize the monitoring device, it is provided in accordance with another preferential embodiment that the coupling device has a transmitter coil for coupling in digital signals into the plug-in connection for communication of the monitoring device with the sensor and, if necessary, also with the transducer.

In principle, it would be possible to realize such "send function" also without the "observation function" discussed before.

Preferably, data for the sensor and/or the transducer generated by the monitoring device from its control unit can be coupled in to the communication between the sensor and the transducer via the coupling device. This makes it possible, for example, to read modified calibration data into the sensor memory and then signal the transducer to once again request such modified sensor data.

Such data generated by the control device of the monitoring device can include different types of data, such as A Manipulation data for influencing the measurement data transferred between the sensor and the transducer, B Command data for signaling task requests to the sensor and/or the transducer, in particular for re-reading sensor data, such as calibration data, and/or C Sensor data, in particular calibration data or other parameter data that must be newly written into the sensor.

In connection with variant B, it should be explained that, typically, only raw data in the form of a voltage is transmitted from the sensor to the transducer, for their evaluation and determination of the measured variable represented by it, such as a pH value, the knowledge of the corresponding calibration data of the sensor on the part of the monitoring device is necessary. For this purpose, the latter can feed a command into the communication link to the sensor, so that the sensor sends its calibration data once again. With such information and the subsequently transmitted raw data, the monitoring device can then determine and display the desired measured variable on site.

If a more advanced sensor is capable of sending digital data to the transducer that directly represent a corresponding measured value, the monitoring device can then tap such data directly and display the corresponding measured variable directly without querying the calibration data of the sensor.

To enable even more flexible use of the monitoring device, it can be provided with an input device for the input of control commands and/or the data outlined above.

In an additional embodiment of the coupling device, a common bifunctional coil can be provided instead of separate receiving and transmitting coils. This is preferably designed as a frame coil on a slotted carrier tube, wherein one or more windings run parallel to the slot edges and the tube end edges connecting them near the edges. With such configuration, the coupling device can encompass the plug-in connection between the sensor and the cable clearly offset from the center of the longitudinal axis of the coupling device, by which a deterioration in the coupling due to opposing field directions is avoided. Such arrangement then has the further advantage that the plug-in connection does not have to be completely covered by the coupling device; rather, a partial coverage is sufficient to receive the carrier frequency transferred by the sensor and/or the transducer via the plug-in connection with the modulated data.

In order to ensure a reliable function of the actual measuring system independent of an intervention in the communication between the sensor and the transducer on the part the monitoring device, the recording of the digital signals transferred via the plug-in connection and the coupling of data into the plug-in connection, which is carried out by means of the coupling device, preferably takes place without a disrupting influence on the measuring system and the stability of the communication connection between the sensor and the transducer.

Different variants are also conceivable with regard to the power supply of the monitoring device. For example, the coupling device can have an integrated power supply in the form of a battery. Alternatively, or in combination with it, it can also have a contactless, inductive power supply device, with which electrical energy is inductively tapped from the plug-in connection between sensor and cables using a corresponding coil arrangement.

In accordance with another preferential embodiment, the signals evaluated by the evaluation device, as they are tapped from the plug-in connection by the coupling device, can be stored in a recording device in a suitable manner for later processing.

The disclosure further relates to the combination, on the one hand, of a measuring system for recording process variables, in particular in liquid analysis, which measuring system comprises a sensor for recording a process variable and a contactless, inductive plug-in connection between the sensor and a cable for preferably bidirectional transfer of digital signals between the sensor and a remote transducer, and, on the other hand, a monitoring device that can be coupled to the plug-in connection in accordance with the preceding claims.

Further features, details and advantages of the invention are given in the following description of an exemplary embodiment on the basis of the attached drawings.

DETAILED DESCRIPTION

Figure 1:
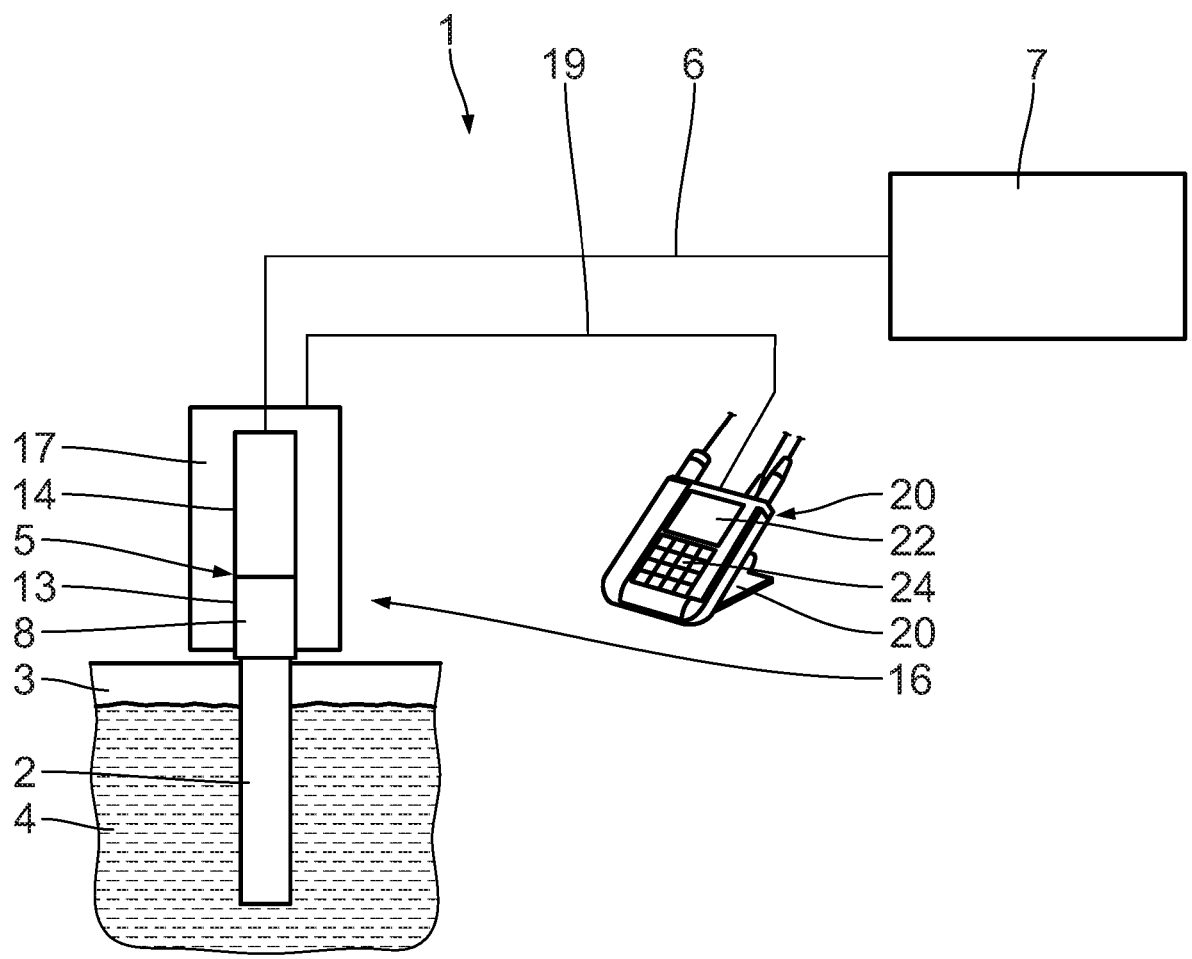
FIG. 1 is a schematic representation of a measuring system with a monitoring device.

FIG. 1 shows a measuring system 1 which has a sensor 2, for example, for measuring the pH value of the process liquid 4 in a process container 3. The sensor 2 is connected via a contactless, inductive plug-in connection 5 with a cable 6, which leads to a remote transducer 7, for example, located in a control room. The measuring system 1 works according to the quasi-industrial "Memosens" standard. This means—in short—that the actual measuring signal of the sensor 2 is processed in an "intelligent" sensor head 8 with a microprocessor control 9 and a data memory 10, in such a manner that it is transferred as a clocked, digital signal modulated onto a carrier frequency, for example in the order of magnitude of a few hundred kHz in a contactless inductive manner, that is, in an electrically isolated manner, via the plug-in connection 5 and the cable 6 to the transducer 7 in accordance with the RS-485 standard. For this purpose, a transfer coil 11, 12 in the plug-in connection 5 is assigned to each the sensor-side plug 13 and the cable-side socket 14 of the plug-in connection 5. The transfer signal is picked up by a microcontroller 15 in the cable-side socket 14 and transmitted to the transducer 7 according to the RS-485 standard. There, the signals are subjected as customary to appropriate evaluation and further processing.

In the opposite direction, control, parameter and command data generated by the transducer 7 are also sent to the sensor 2 via the plug-in connection 5 according to the same standard and processed there in accordance with the Memosens standard.

Figure 2:
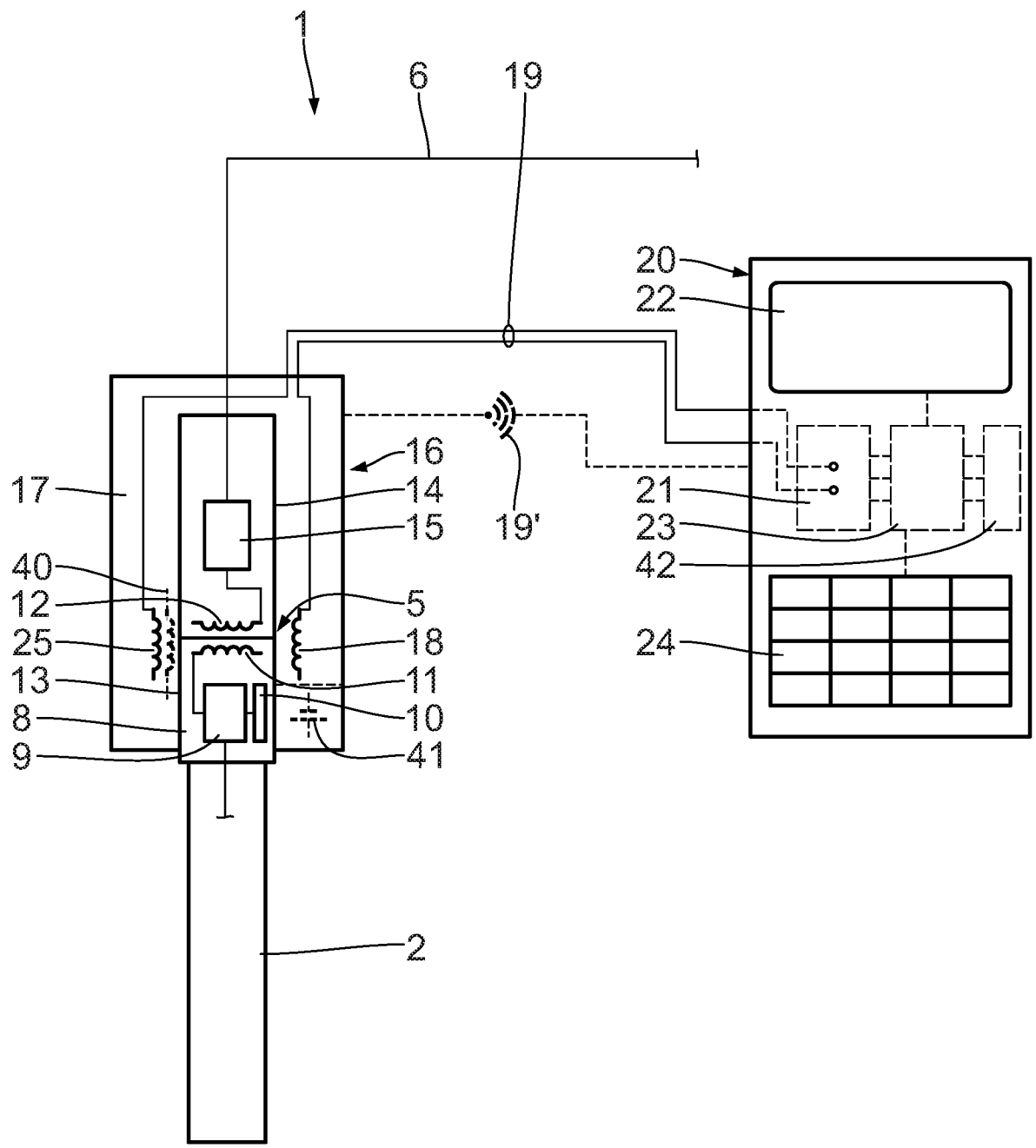
FIG. 2 is an enlarged, sectional and more detailed schematic representation of the measuring system with a monitoring device in accordance with FIG. 1.

The monitoring device 16 shown in FIGS. 1 and 2 is provided in order to have on-site access to the data sent by the sensor 2 or the transducer 7 and transferred via the plug-in connection 5 at the process container 3 and to loop control, parameter and command data into the measuring system at this point if necessary. This has a contactless coupling device 17 that can be attached to the plug-in connection 5 and that can be placed around the plug-in connection 5 as a kind of ring collar, for example. In order to record the signals inductively transferred in both directions between the two transfer coils 11, 12 of the plug-in connection 5, a receiving coil 18—which can also be formed by several coils—is arranged in the coupling device 17. This allows the carrier frequency generated by the Memosens system to be received with the modulated data and processed in the monitoring device 16.

For this purpose, such received signals are transmitted via a cable connection 19 to a handheld device 20—for example a multi-parameter portable for pH, conductivity and oxygen Memosens sensors called "Portavo 907 Multi" from Knick Elektronische Messgeräte GmbH & Co. KG, 14163 Berlin. There, an evaluation device 21 in the form of a microprocessor further processes the transmitted signals and presents them on a display device 22 so that they can be recognized by an observer. In this respect, measured values of process variables, sensor data, in particular calibration and/or load data of the sensor 2 recorded by the sensor 2 can be recorded by the monitoring device 16, evaluated and output via such display device 22.

Instead of or in addition to the cable connection 19, a wireless radio connection 19' can be used between the coupling device 17 and the handheld device 20 with corresponding components in both devices for data transfer.

In principle, the monitoring device 16 is operated by a control device 23 on the basis of a conventional microcontroller, which in the example shown is formed by the control device of the commercially available handheld device 20.

The handheld device 20 also has an input device 24, for example in the form of a membrane keyboard, which can be used to initiate the sending of control commands and/or data in the communication between the sensor 2 and the transducer 7. For this purpose, one or more transmitting coils 25 are provided in the coupling device 17, which transfer signals generated by the control device 23 on the basis of corresponding inputs via the input device 24 in the form of a carrier frequency with modulated data inductively to the transmitting coils 11, 12 in the plug-in connection 5, from where they can be passed on and processed according to the usual Memosens communication between the sensor 2 and the transducer 7.

With regard to the power supply integrated into the coupling device 17, different alternatives are shown in dashed lines in FIG. 2. For example, an inductive power supply device 40 can extract electrical energy without contact from the signals transferred via the plug-in connection 5 between the transfer coils 11, 12. A battery supply 41 can also be provided as an alternative or in addition. The latter can also be accommodated in the handheld device 20.

Finally, in the monitoring device 16, for example—as indicated by the dashed lines in FIG. 2—in the handheld device 20, a recording device 42 can be provided, in which signals tapped by the coupling device 17 from the plug-in connection 5 are recorded by appropriate storage and made available for later processing.

As already mentioned above, the monitoring device 16 can be used, for example, to transfer manipulation data to influence the measurement data transferred between the sensor 2 and the transducer 7, command data to signal task requests to the sensor 2 and/or the transducer 7, in particular to re-read sensor data and/or sensor data itself, in particular calibration data or other parameter data to be newly written into the sensor.

In order to practically modulate such data from the outside onto the measuring system 1, pulses corresponding to the carrier frequency, which manipulate the original signal, are coupled in. For a more detailed explanation, data communication according to the RS-485 standard will be briefly discussed in this connection on the basis of FIGS. 3, 4A and 4B.

Figure 3:
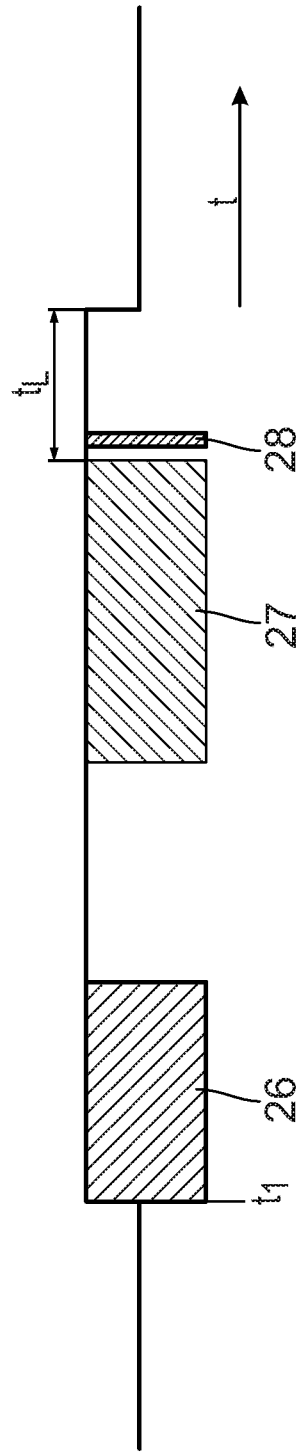
FIG. 3 is a temporal signal diagram of the data transfer between the sensor and the transducer in accordance with the RS-485 standard.

As shown in FIG. 3, at a certain time ti the transducer 7 sends a request telegram 26 to the sensor 2. This responds with a response telegram 27. As can be seen from the time grid drawn as a thin "square wave signal" in FIG. 3, there is still a time gap $t_L$ after the response telegram 27, until the transfer path is set to "receive" by switching the direction. Such time gap ty is used to couple in a signaling code 28 through the monitoring device 16.

This can contain, for example, a command to the sensor 2 to send its calibration data to the transducer 7. Such calibration data can then be recorded by the monitoring device 16 and stored in its evaluation unit 21. In normal operation, the sensor 2 then once again sends the raw data representing the measured variable in the response telegram 27, which is picked up by the monitoring device 16. From this, the actual measured variable is determined with the assistance of the calibration data stored in the evaluation unit 21 and displayed.

Figure 4A:
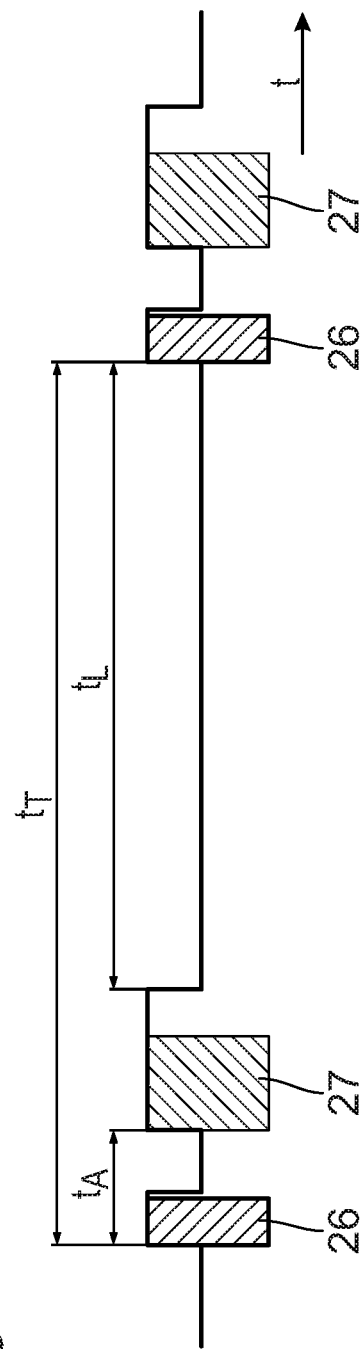
FIG. 4A and FIG. 4B are temporal signal diagrams of the data transfer in accordance with FIG. 3 without and with data coupling on the part of the monitoring device.
Figure 4B:
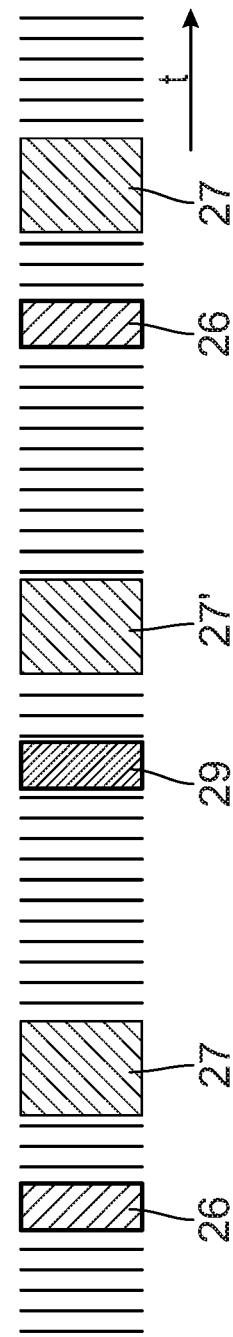

As shown in FIGS. 4A and 4B, the transducer 7 communicates cyclically with the sensor 2 to request measured values by sending a request telegram 26 in a clocked manner—see cycle time $t_T$—after which the sensor 2 responds with a response telegram 27 in a fixed time grid—see response time $t_A$.

In accordance with FIG. 4B, the time gap ty between the telegrams 27, 26 can be used by the monitoring device 16 to send a data telegram 29 to the sensor 2 itself, in order to, for example, write corrected calibration data into it. The sensor 2 responds to this again with a response telegram 27'. After changing the calibration data, the monitoring device 16 must signal this to the transducer 7 with a corresponding data telegram (not shown) so that such changed calibration data can be read out again.

Figure 5:
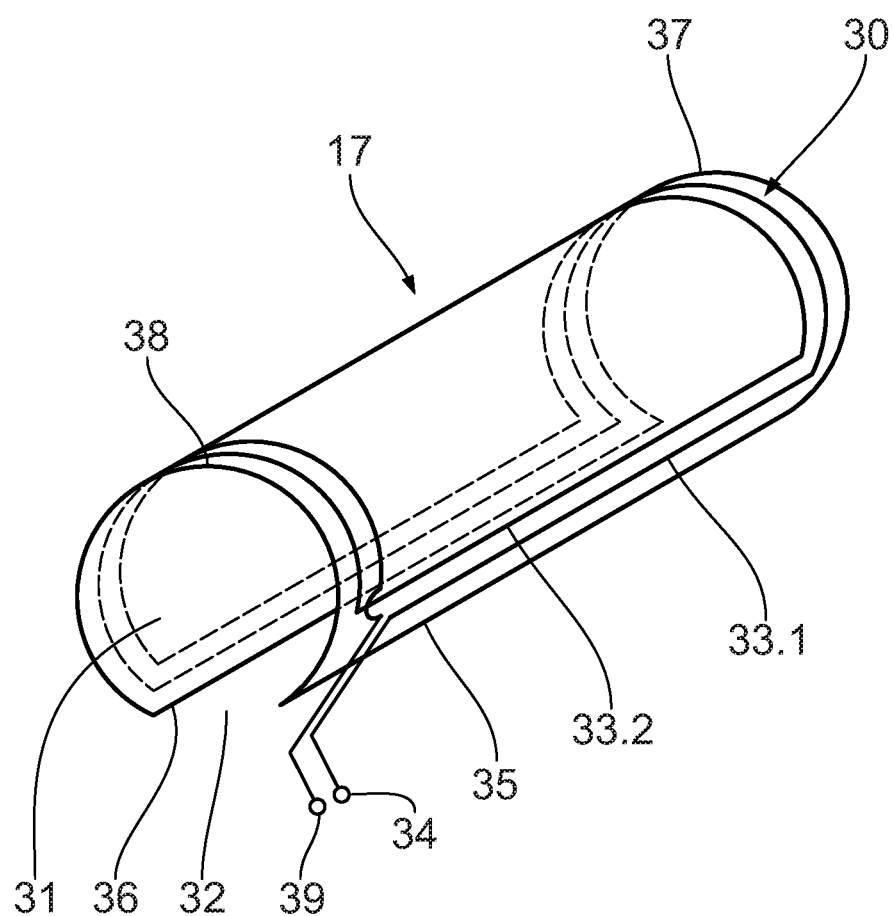
FIG. 5 is a highly schematic representation of a bifunctional frame coil of the monitoring device.

Finally, FIG. 5 shows a highly schematic representation of a special embodiment of the coupling device 17 used in the monitoring device 16. This comprises a bifunctional coil 30 with a slotted carrier tube 31, which is provided with a slot 32 running parallel to the longitudinal axis of the tube. The conductors in the form of wires or traces forming the two windings 33.1, 33.2 run in or on the carrier 31 to form the first winding 33.1 starting from an input terminal 34 near the edge parallel to the slot edge 35, then over the one tube end edge 37 connecting such slot edge 35 with the second slot edge 36, further parallel to the rear slot edge 36 up to the second tube end edge 38 and from there again parallel to such tube end edge 38 in the direction of the input terminal 34. There, the circulation is repeated for the second winding 33.2, after which the conductor path ends in an output terminal 39.

The winding sections running parallel to the tube end edges 37, 38 absorb in particular the magnetic field lines generated by the contactless plug-in connection 5 in a main direction with good inductive coupling, in order to generate a corresponding induction voltage at the coil connections 34, 39. Thereby, a partial overlapping of the coupling device 17 with its carrier tube 31 and the plug-in connection 5 in relation to the longitudinal direction of the arrangement is completely sufficient.

As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The invention claimed is:

1. A monitoring device for a measuring system for measuring
   process variables,
   wherein the measuring system comprises
      a sensor (2) for recording a process variable and
      a plug-in connection (5) that is contactless, inductive between the sensor (2) and a cable (6) for bidirectional transfer of signals between the sensor (2) and a remote transducer (7), the monitoring device (16) comprising:
   a coupling device (17) configured to be placed on the plug-in connection (5) and configured to operate without contact for recording the signals transferred via the plug-in connection (5);
   an evaluation device (21) for evaluating the recorded signals; and
   a display device (22) for presenting the evaluated signals.

2. The monitoring device according to claim 1,
   wherein the coupling device (17) has a receiving coil for recording the signals transferred via the plug-in connection (5).

3. The monitoring device according to claim 1,
   wherein the evaluation device (21) and the display device (22) are arranged in a device unit with the coupling device (17) or in a handheld device (20) which is connected to the coupling device (17) via a cable connection (19) or wireless connection (19').

4. The monitoring device according to claim 1,
   wherein values of process variables which are recorded by the sensor (2) or sensor data are recorded by the monitoring device (16), evaluated, and output via the display device (22).

5. The monitoring device according to claim 1,
   wherein the coupling device (17) has a transmitting coil (25) for coupling in digital signals (28, 29) for communication of the monitoring device (16) with the sensor (2) or the transducer (7) into the plug-in connection (5).

6. The monitoring device according to claim 5,
   wherein data for the sensor (2) or the transducer (7) generated by the monitoring device (16) by its control device (23) in the form of the digital signals can be coupled into the communication between the sensor (2) and the transducer (7) via the coupling device (17).

7. The monitoring device according to claim 6,
   wherein the following types of data are generated by the control device (23):
   manipulation data for influencing the signals transferred between the sensor (2) and the transducer (7);
   command data for signaling task requests to the sensor (2) or the transducer (7), including for re-reading sensor data, such as calibration data; or
   sensor data, including calibration data or other parameter data that must be newly written into the sensor (2).

8. The monitoring device according to claim 1,
   further comprising an input device (24) for inputting control commands or data.

9. The monitoring device according to claim 2,
   wherein the coupling device (17) further has a transmitting coil (25) for coupling in digital signals (28, 29) for communication of the monitoring device (16) with the sensor (2) or the transducer (7) into the plug-in connection (5), and
   wherein the receiving coil and the transmitting coil are formed by a common, bifunctional coil (30).

10. The monitoring device according to claim 9,
    wherein the bifunctional coil (30) is designed as a frame coil on a slotted carrier tube (31) with one or more windings (33.1, 33.2) that run parallel to slot edges (35, 36) and tube end edges (37, 38) connecting them.

11. The monitoring device according to claim 6,
    wherein the recording of the signals transferred via the plug-in connection (5) and the coupling in digital signals into the plug-in connection (5), which is carried out in each case by the coupling device (17), takes place without a disrupting influence on the measuring system and a stability of the communication between the sensor and the transducer.

12. The monitoring device according to claim 1,
    wherein the coupling device (17) has an integrated power supply.

13. The monitoring device according to claim 12,
    wherein the integrated power supply is
    a battery supply (41) or
    an inductive power supply device (40), which is supplied with power from the plug-in connection (5).

14. The monitoring device according to claim 1,
    wherein the signals evaluated by the evaluation device (21) are recorded in a recording device (42).

15. A measuring system for recording process variables, comprising:
    a sensor (2) for recording a process variable;
    a contactless, inductive plug-in connection (5) between the sensor (2) and a cable (6) for bidirectional transfer of digital signals between the sensor (2) and a remote transducer (7); and
    the monitoring device (16) as in claim 1, coupled to the contactless, inductive plug-in connection (5).

* * * * *